United States Patent [19]
Islam et al.

[11] Patent Number: 5,944,793
[45] Date of Patent: Aug. 31, 1999

[54] COMPUTERIZED RESOURCE NAME RESOLUTION MECHANISM

[75] Inventors: Nayeem Islam, Yorktown Heights; Colin James Parris, Brewster; Daniel Charles Sturman, Croton-on-Hudson, all of N.Y.

[73] Assignee: International Business Machines Corporation, Armonk, N.Y.

[21] Appl. No.: 08/799,816

[22] Filed: Feb. 13, 1997

Related U.S. Application Data

[60] Provisional application No. 60/031,462, Nov. 21, 1996.
[51] Int. Cl.[6] .............................. G06F 13/38; G06F 15/17
[52] U.S. Cl. ......................... 709/220; 709/228; 709/229; 709/245
[58] Field of Search .......................... 395/200.5, 200.55, 395/200.56, 200.58, 200.49, 200.33, 200.75, 200.59; 707/10

[56] References Cited

U.S. PATENT DOCUMENTS

| | | | |
|---|---|---|---|
| 5,434,974 | 7/1995 | Loucks et al. | 395/200.75 |
| 5,706,501 | 1/1998 | Horikiri et al. | 395/200.56 |
| 5,729,689 | 3/1998 | Allard et al. | 395/200.58 |
| 5,764,906 | 6/1998 | Edelstein et al. | 395/200.49 |
| 5,765,154 | 6/1998 | Horikiri et al. | 707/10 |

OTHER PUBLICATIONS

Dasgupta et al., "Resource Location in Very Large Networks", IEEE conference, 1994.

Comer et al., "Model of Name Resolution in Distributed Systems", IEEE conference, 1986.

Sam X. Sun, Handle System: "A Persistent Global Naming Service Overview and Syntax", Nov. 14, 1997, http://www.handle.net/draft–ietf–handle–system–01.htm, (The official IETF text version of this Internet Draft can be found at ftp://ietf.org/internet–drafts/draft–sun–handle–system–00.txt).

Keith Moore et al., Resource Cataloging and Distribution Service (RCDS), Netlib Development Group, University of Tennessee, Jan. 16, 1996, http://www.netlib.org/srwn/srwn18.

Kaufman, C., Perlman, R., and Spencer, M. "Network Security: Private Communication in a Public World." Prentice–Hall, Inc., Englewood Cliffs, New Jersey, 1995.

Schneier, B. Applied Crytography Second Edition: Protocols, Algorithms, and Source Code in C. John Wiley & Sons, Inc., New York, 1996.

Mullender, S. ed., "Distributed Systems." ACM Press, New York, 1989.

Primary Examiner—Mark H. Rinehart
Attorney, Agent, or Firm—Kevin M. Jordan

[57] ABSTRACT

A mechanism for creating links and services on the Internet to reduce the bottlenecks at service providers by associating code with links to make them intelligent and a special protocol between the links and the back end servers to maintain scalableness and performance. Scalableness is supported by moving much of the functionality of searching onto the client side.

16 Claims, 9 Drawing Sheets

COMPUTERIZED RESOURCE NAME RESOLUTION MECHANISM

CROSS REFERENCE TO RELATED APPLICATIONS

The present application claims priority to co-pending U.S. provisional application Ser. No. 60/031,462 filed Nov. 21, 1996.

FIELD OF INVENTION

This invention is related to computers and computer networks and particularly to an improved method and mechanism for resource name resolution. More particularly, it relates to a mechanism for name resolution on the Internet that is customized and which enhances the level of availability of the resolved information resources.

GLOSSARY OF TERMS

While dictionary definitions apply to the terms herein, the following definitions of some terms are also provided to assist the reader:

Internet
    The network of networks and gateways that use the TCP/IP suite of protocols.
Client
    A client is a computer which issues commands to a server that performs the task associated with the command.
Server
    Any computer that performs a task at the command of another computer is a server. A Web server typically supports one or more clients and handles client requests for data using the Hyper-Text Transfer Protocol (HTTP).
World Wide Web (WWW or Web)
    The Internet's application that lets people seeking information on the Internet switch from server to server and database to database by activating highlighted words or phrases of interest (hyperlinks). An Internet WWW server supports clients and provides information. The Web presents a view of the Internet where all of resources are addressed as URLs.
Universal Resource Name (URN)
    A naming scheme for resources on the Internet that can be used to map a particular name to one or more resources. The URN has three fundamental capabilities: its is global in scope (that name has the same meaning everywhere), it is globally unique (the same URN will never be assigned to different resources), and it is persistent (for most cases the lifetime of the URN is permanent).
Universal Resource Characteristics (URC)
    A URC is a scheme for locating resources in the Internet based on the attributes of that resource. It binds attributes to names or locations.
Universal Resource Locator (URL)
    A way to uniquely identify or address information on the Internet. Can be considered to be a Web document version of an e-mail address. They can be accessed with a Hyperlink. An example of a URL is "http://www.arun.com:80/table.html". A URL has four components. Starting from the left, the first specifies the protocol for accessing the resource, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.
HyperText Markup Language (HTML)
    HTML is the language used by Web servers to create and connect documents that are viewed by Web clients. HTML uses Hypertext documents.
Hypertext transfer protocol (HTTP)
    HTTP is an example of a stateless protocol, which means that every request from a client to a server is treated independently. The server has no record of previous connections. HTTP is one of the possible access protocols specified in a URL.
Internet Browser or Web browser
    A graphical interface client tool that runs Internet protocols such as http, and display results from the server on the client's screen. The browser can act as an Internet tour guide, complete with pictorial desktops, directories and search tools used when a user "surfs" the Internet. In this application the Web browser is a client service which communicates with the World Wide Web.
Applet
    A code fragment which is downloaded from a server to a client and executes at the client.
Java
    An object-oriented computer programming language developed by Sun Microsystems for programming on the Internet. Most Internet browsers support Java as a language for describing Applets.
Object
    An encapsulated entity incorporating some data and a set of publicly accessible methods. The object may only be manipulated through invocation of the defined methods.
Distributed system
    A collection of computing machines, each with their own CPU and storage (including primary memory). The machines are connecting though a communication medium which may include, but is not limited to, Ethernet, fiber-optic ATM network, or radio (cellular) technology.

BACKGROUND

Traditional information services are now in a state of rapid evolution created by the need to address their customers growing dependency on accessible, relevant information. One of the most significant products of this evolution is the distribution of information resources throughout the system, that is, the creation of highly distributed information services.

One noted example of this evolution is the World Wide Web (WWW). In this example resources, usually in the form of digital documents, are distributed through the Internet and are accessed by users through one of many possible browser interfaces. The access model is that of "client/server" with the browser being the client and the Web server being the server. In this model the clients may access a file (bookmarks) or query a well-known search engine (another information service) as the first step in locating a particular document or resource. This access or query results in an identifier, called a Uniform Resource Locator (URL), that uniquely identifies the document or resource that resides in the system, and can be used to access the desired resource.

As in the above example of the Web, most distributed information services resources are identified by names which are resolved into some unique representation that identifies the location, and possibly other characteristics, of a single specific service. Resolution in these distributed systems is usually static and one-to-one (i.e. the name resolves to one and only one unique representation). The static nature of the resolution process does not permit the service to adapt itself to any variations in client or infrastructure behavior. A simple example of this inflexibility can be seen when situations on the Web arise such that the local or global client load increases dramatically (this can be due to new versions of software becoming available or a partitioning of the network which causes some parts of the service to be inaccessible) and the service cannot scale itself to accommodate the performance and accessibility requirements of its clients.

These flexibility constraints herald the need for a mechanism that enables name resolution in a manner that permit clients to locate relevant resources and which provides high availability of these resources.

There have been other methods that have sought to extend the resolution capability in distributed information services.

For example, the Resource Cataloging and Distribution Service (RCDS) developed by the Netlib Development Group of the University of Tennessee is an architecture for cataloging the characteristics of Internet-accessible resources, replicating such resources (to improve accessibility), and for cataloging the current locations of the replicated resources. The integrity of the files provided to the users are ensured using message digests and public-key authentication.

RCDS is a system that consists of several components: (1) Clients, which are WWW browsers and consume the resources provided by the system, (2) File Servers, which provide access to the files required by the client, (3) Resource Catalog Servers, which maintain information about the characteristics of a network-accessible resources and accept queries about these characteristics from clients, (4) Location Servers, which maintain information about the locations of network-accessible resources and accept queries for location data from clients, (5) Collection managers, which manage the files on the file server (it adds, updates and removes files from the file server), and (6) publication tools, which accept new files and descriptions from content providers and inject the files, into the system.

The resolution component of RCDS is composed of the Resource Catalog Servers and the Location Servers. The Resource Catalog Server resolves the URN (or URL) into a Location Independent File Name (LIFN) (using the URC), while the Location Server resolves the LIFN into a URL. From the characteristics (or metadata) present in the URC, RCDS can provide a label that the client uses to reduce the scope of the resolution.

RCDS is inadequate in three ways:

1. There is no added functionality provided in the resolution process in that intelligence (e.g., a simple search engine in the code or access to a search engine in the system) can be used to customize the resource list available to the client;

2. The client cannot negotiate with the service (with or without client intervention) taking into consideration both the client and the service properties to provide the best possible service for the client; and, 3. There is no automatic mirroring of server side objects for ensuring the performance and availability of the service.

In the CNRI Handle System scheme proxy servers are used to permit Web browsers and other clients to resolve names (called handles in their terminology) and caching servers are used to cache previously resolved servers. Here, handles can be resolved based on some characteristics but there is no description or implementation to indicate the manner in which this is accomplished. In this scheme, the caching and proxy servers do not permit negotiation in these transactions. This scheme is also inadequate because it does not permit customized client side searches to locate relevant resources and does not attempt to ensure that accessibility is high by automatic mirroring.

SUMMARY

This invention is directed towards a resource name resolution method and system that permits customized searches at the client and supports high availability of service at the content provider.

In accordance with a first aspect of the present invention, a mechanism for naming resources in a distributed computing environment, where the resource is represented through a combination of code and data and where execution of the code is at the client desiring the resource, is presented. The resolution mechanism (code) as well as the data upon which this mechanism computes may be customized for the resources being identified.

In accordance with a second aspect of the present invention, the code resolves to a resource using data and code obtained from the distributed environment, i.e. the client, network, SmartLink creator, and content provider. The resolution mechanism is comprised of a client side and server side component. The client side component's code and data may be obtained from the environment in a number of phases as dictated by conditions defined in the SmartLink code. In each phase, computation on this code and data may be used to obtain additional data. The final phase of evaluation resolves to a resource. The server side component maintain coordinated metrics which may be queried by the client side component during evaluation. Intermediate results computed by the client side component may be securely written back to the server. Server side components provide support for evaluation by providing automatic mirroring and metric update facilities which are managed by a site group leader.

BRIEF DESCRIPTION OF THE DRAWINGS

For further features and advantages of the present invention, refer to the attached detailed description and drawings, wherein.

DETAILED DESCRIPTION

Figure 1:
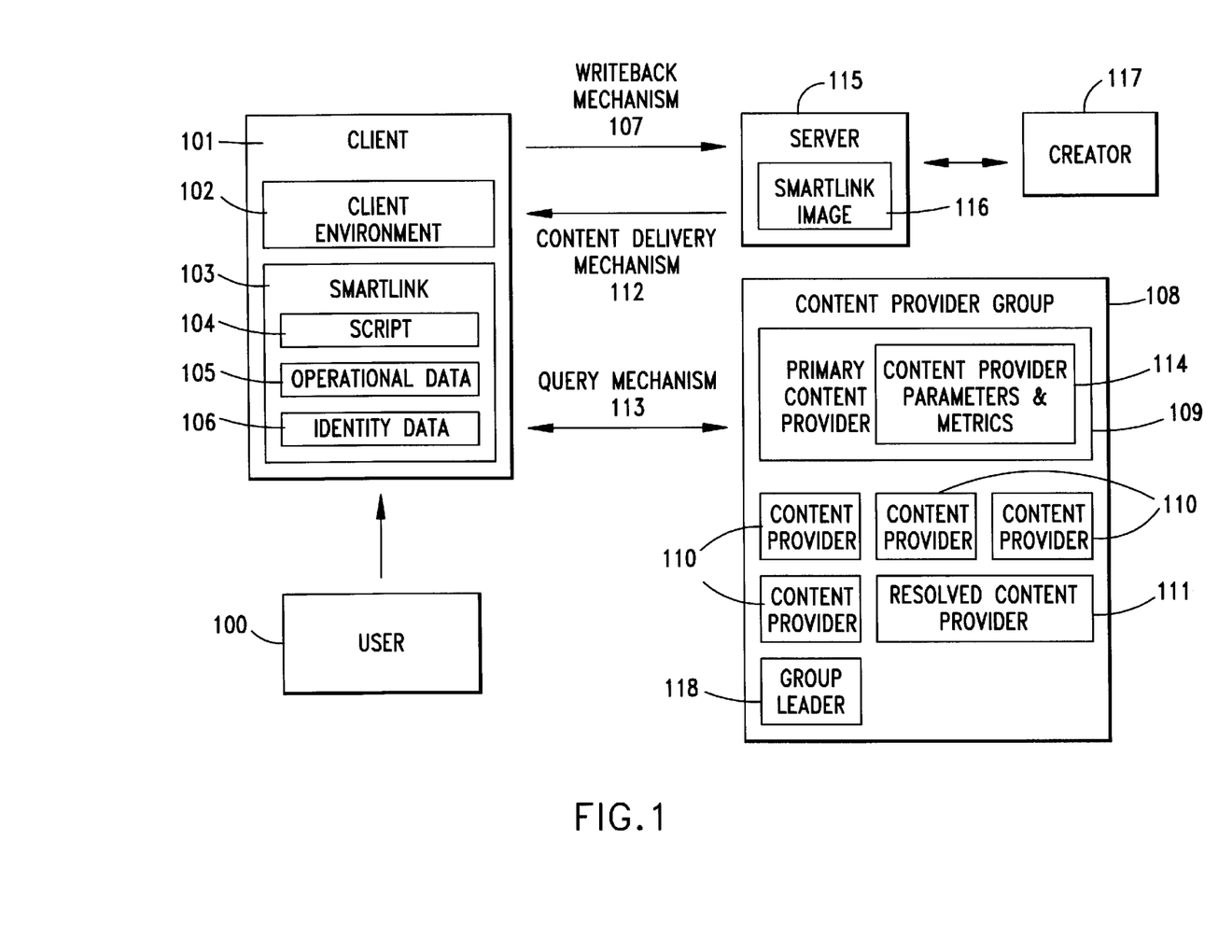
FIG. 1 depicts a content delivery mechanism according to the present invention.

FIG. 1 depicts a content delivery mechanism having features of the present invention. On request of a user 100, a client machine 101 requests, from a server machine 115, an image 116 (i.e. both code and data in a format suitable for storage) of a client-executable naming resource. The naming resource, termed a SmartLink 103, is provided through a content delivery mechanism 112. Examples of a delivery mechanism include floppy diskettes, CD-ROMS and the Internet. Examples of executable content implementing a SmartLink include Java and ActiveX controls. The SmartLink includes a script (code) 104, operational data 105, and identity data 106. Since a SmartLink resolves at the client machine, a server may provide SmartLinks customized to the clients needs. Thus, SmartLink resolution is not static and may choose one of many possible content providers, thereby providing high availability of the service desired. Furthermore, the mechanism is inherently load-balancing as no one resource (e.g. the server machine) must perform complex name resolution.

Upon activation by a user, the SmartLink script 104 executes at the client machine 101 to choose one of many possible content provider machines 110 as the primary content provider 109. The script 104 uses the SmartLink parameters 105 and the client environment parameters 102 to perform this calculation. Examples of content providers include software distribution centers, stock quote services, and on-line consumer goods retailers. Examples of SmartLink parameters include content provider location, previous content provider load, and content delivery bandwidth. Examples of client environment parameters include client location, content delivery bandwidth, and user budget.

Using a query mechanism 113, the SmartLink 103 obtains content provider parameters 114 from the primary content provider 109 through a query mechanism 113. Examples of a query mechanism include protocols such as RPC, HTTP, or TCP executing through media such as the Internet, modem, FAX, or a cable TV network. Examples of content provider parameters include current content provider membership, current content provider loads, content provider service charges, and content provider location. The SmartLink code 104 evaluates using the SmartLink parameters 105, client environment parameters 102, and content provider parameters 114 and results in a reference to resolved content provider 111. The SmartLink uses a content delivery mechanism 112 to transfer the resolved content provider's content to the client machine. A write-back mechanism 107 stores updated metrics obtained by the SmartLink 103 in the image of the SmartLink 116 at the server machine 115 for use by the next client machine 101 obtaining the SmartLink.

Figure 2:
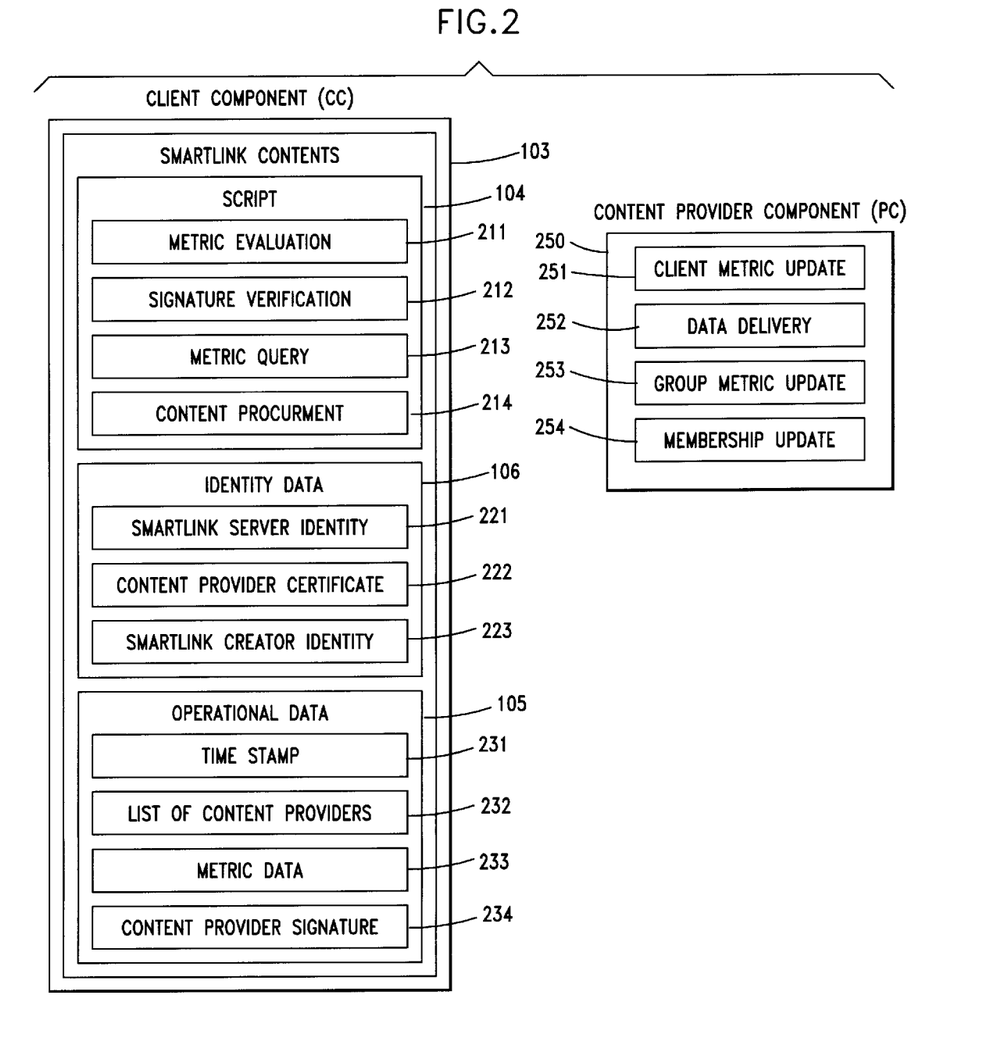
FIG. 2 is a view of the system of a SmartLink and its component parts in accordance with the present invention.

FIG. 2 depicts an example of the structure of a SmartLink 103. The SmartLink consists of two components: a client component, called the SmartLink CC 103, and a content provider component, called the SmartLink PC 250. The SmartLink CC 103 runs on a client machine 101, and the SmartLink PC 250 runs on any of the content provider machines 110, the primary content provider machine 110, or the group leader machine 118. Fundamentally, the SmartLink CC consists of a script 104 which operates on data obtained from various members of the distributed system. In particular, this SmartLink CC maintains operational data 105 and identity data 106. The SmartLink CC script 104 is composed of multiple modules. Examples of modules include a metric evaluation module 211 that chooses the best content provider 110 from a metric list to fill the roles of primary content provider 109 and resolved content provider 111, a signature verification module 212 that authenticates parameters, a metric query module 213 that obtains metrics from the primary content provider 109 and a content procurement module 214 that obtains content from the resolved content provider 111. Content providers are organized into content provider groups 108 coordinated by a group leader 118.

SmartLink CC identity data 106 contains identity credentials for the server at which the client accessed the smartlink (SmartLink Server identity 221), the certificate for authorized content providers (Content provider certificate 222), and the identity of the SmartLink's creator (SmartLink creator identity 223). Use of identity information is optional and based on the choice of modules for the SmartLink Script 104. Operational data 105 may consist of a set of distinct modules used by the metric evaluation module 211. The most recent metric and content provider membership data available, obtained either from the server 115 when the SmartLink CC was delivered 403 to the client machine 101 or from a primary content provider 109 when queried 409 by the SmartLink CC, is stored in the Operational data. Data from the server is obtained when a previous incarnation writes 410 its data back to the image 116 through the write-back mechanism 107. A secure write-back mechanism is described in FIG. 5. The list of possible content providers is stored in the list of content providers 232 and the metric data for these machines is stored in the metric data module 233. The time at which this data was obtained is recorded in the time stamp module 231. The time stamp module is examined to determine if a test for complete evaluation may be made. If values for all metrics required by the metric evaluation module 211 are present in the metric data module 233, a request 412 may be made directly to a resolved content provider. Otherwise, a SmartLink CC first chooses a primary content provider 109 to request 408 and obtain 409 a new set of metrics.

Figures 6, 6A:
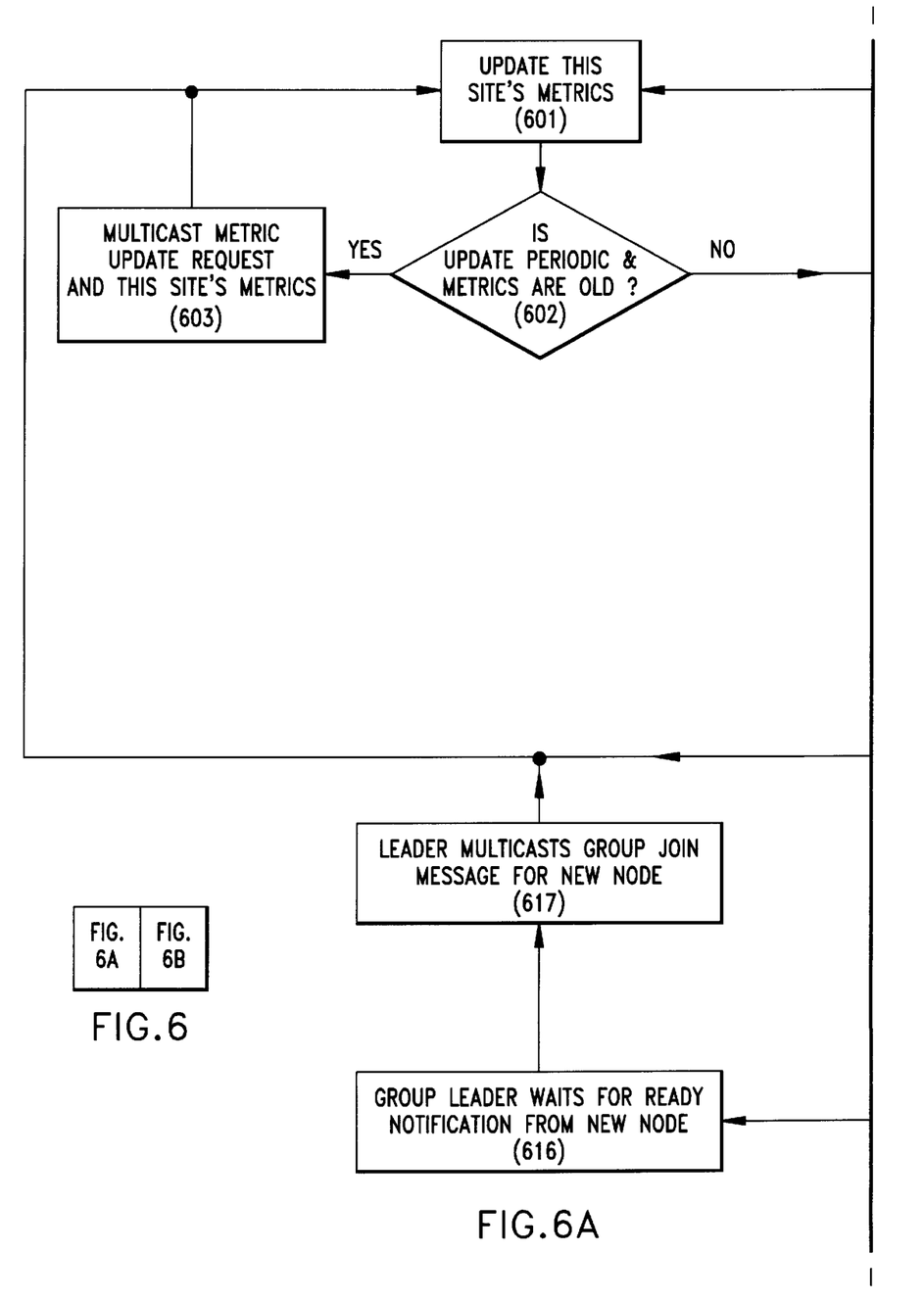
FIG. 6 shows the process of a group leader.
Figure 6B:
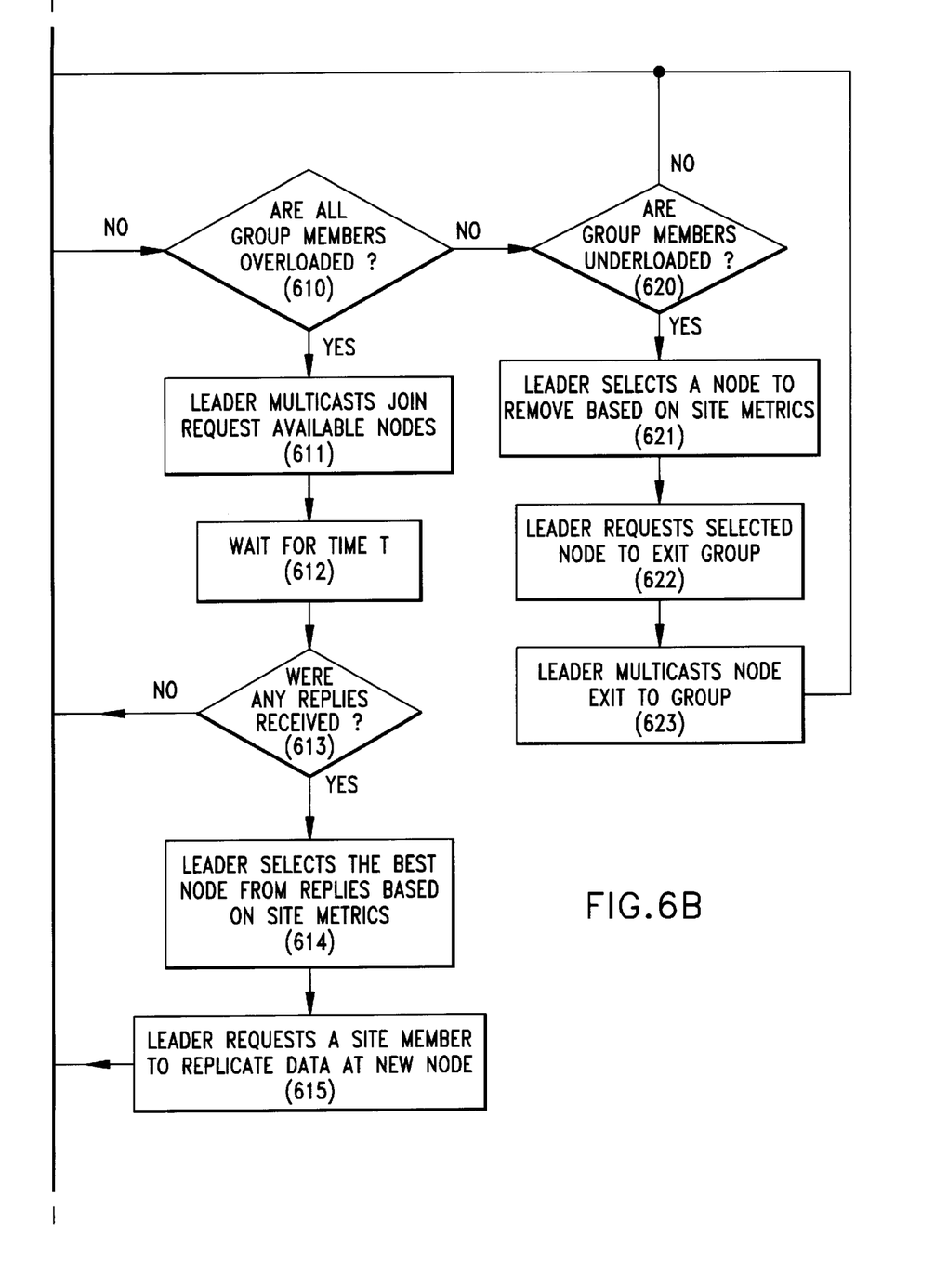

The SmartLink Content Provider Component (PC) 250 consists of four modules. The Client Metric Update module 251 supplies metrics to the CC on demand. The Data Delivery module 252 transmits content to the CC using a content delivery mechanism 112. The Group Metric Update module 253 supplies metrics to other content providers 110 managed by a group leader 118. The Membership Update module 254 handles requests from the group leader 118 to join and leave the group. An example of the process for the PC 250 is shown in FIG. 6.

Figure 3:
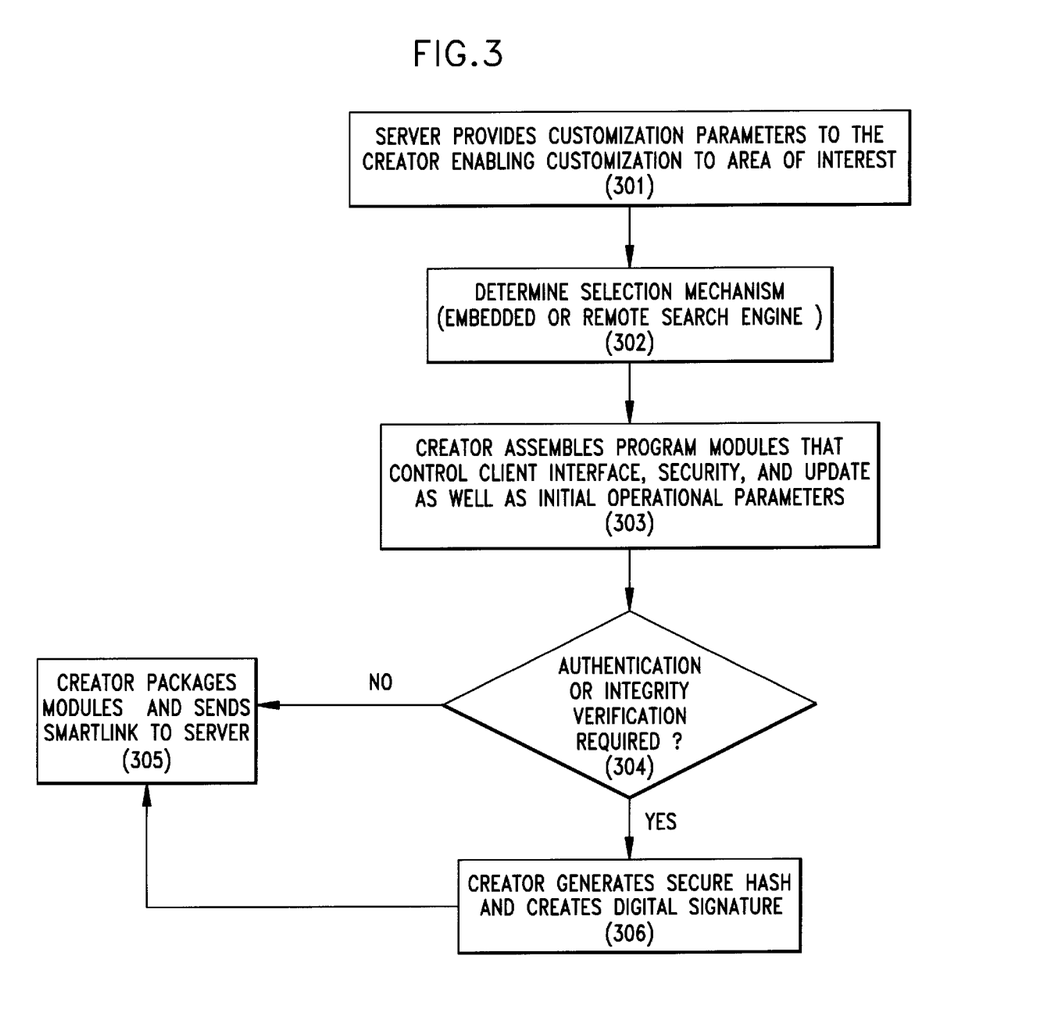
FIG. 3 shows how a SmartLink creator may create a new SmartLink based on a set of parameters provided by a server.

FIG. 3 depicts an example of the SmartLink CC creation process. SmartLink creation is preferably performed at the creator 117 which is invoked by a server 115. Those skilled in the art will realize that the role of creator could be subsumed by the server as well. Furthermore, although most often a SmartLink will be created once and stored by a server, a server may create a new SmartLink in response to each request from a client.

SmartLink CC creation involves interaction between a server 115 and a creator 117 to create a SmartLink CC image. The server provides 301 parameters to the creator through a query mechanism 113 providing customization parameters for the creation of a SmartLink CC image 116. Examples of customization parameters include the type of service referenced by a SmartLink CC 103, the nature of the SmartLink CC evaluation process, or the geographic area to which SmartLink CC 103 accesses are restricted. The creator 117 uses the customization parameters to choose a selection mechanism 302 and to choose 303 the script 104 and initial operational data 105. If the parameters dictate 304 secure operations are required, the creator also generates 306 identity data 106 for the SmartLink CC . The SmartLink CC image is then delivered 305 to the server machine through a content delivery mechanism 112 and stored at the server.

Figure 4:
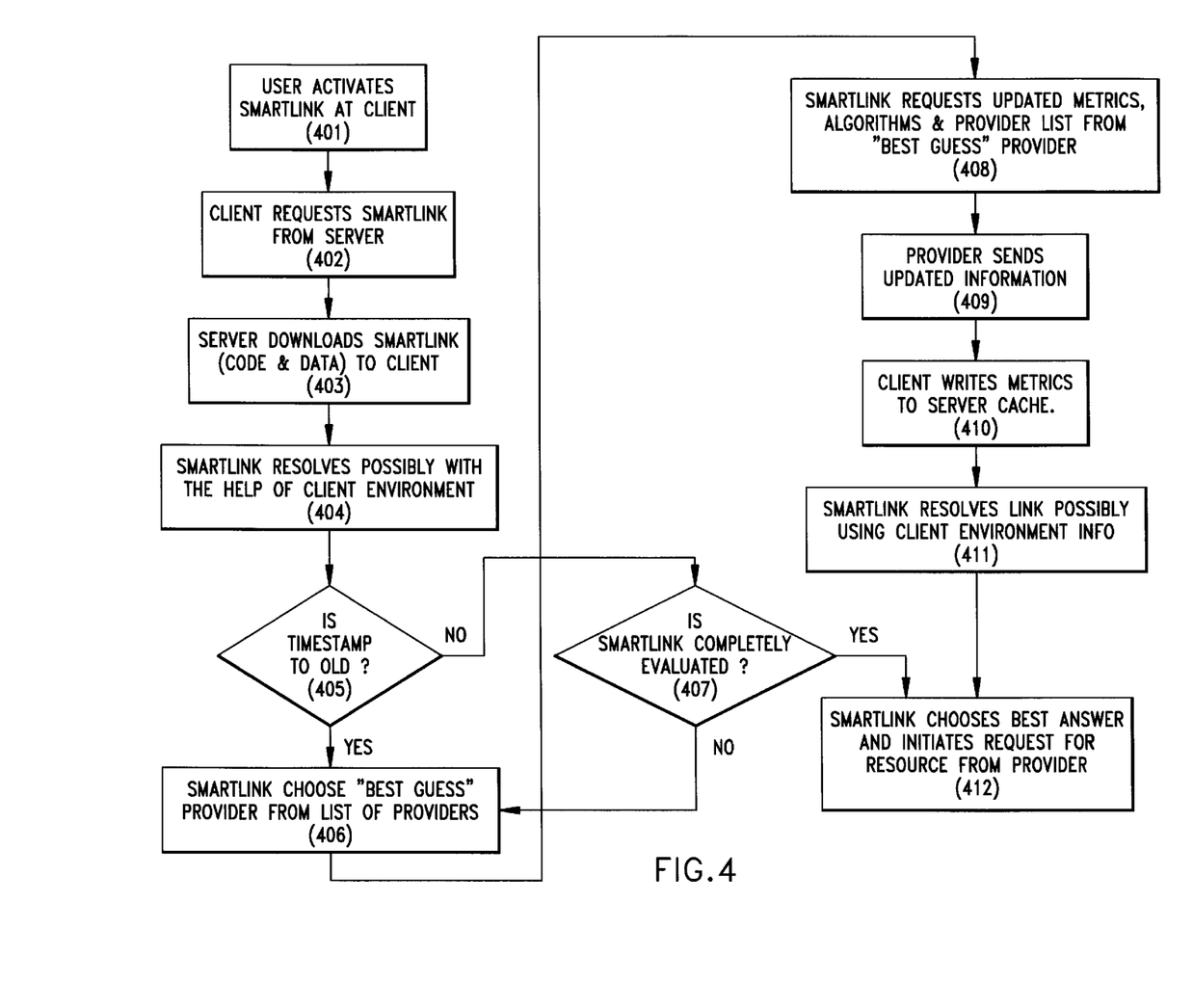
FIG. 4 depicts the process of evaluation of the SmartLink system shown in FIG. 2.

An example of the SmartLink evaluation process is depicted in FIG. 4. SmartLink evaluation is performed at the client. The user activates the SmartLink 401 and the client machine requests the SmartLink from the server 402. The server down loads the SmartLink to the client 403. The SmartLink may partially evaluate using information from client environment 404. The SmartLink checks 405 the time stamp on the metric information it may have cached from its last execution. If the cached metrics are found to be recent enough and the SmartLink was found 407 to be able to evaluate 404 completely (i.e. a single content provider was identified), the SmartLink contacts the chosen content provider and initiates 412 transfer of content from the resolved content provider 111 through a content delivery mechanism 112. If metrics are out of date or the SmartLink was unable to complete evaluation, a heuristic as determined by the SmartLink Metric Query module 213 is used to identify the best possible content provider from which to obtain new metrics. This content provider is termed the primary content provider 109. The SmartLink requests 408 the updated metrics, list of providers available, and evaluation algorithms from the primary content provider. The data is sent 409 by the primary content provider to the SmartLink CC 103. The SmartLink CC then uses a write-back mechanism 107 to store 410 the data at the server 115. Using this data, the SmartLink CC completes 411 evaluation to compute the resolved content provider 111 and contacts 412 the resolved content provider then to obtain the content.

Note the multi-phase structure of SmartLink evaluation enables the invention to be customizable and provide high availability. By querying the distributed environment, a SmartLink is able to choose the best content provider available, where "best" may be defined by any possible set of metrics as long as these metrics may be accessed by the SmartLink. One skilled in the art will realize the two-phase nature of this feature (i.e. requesting metrics from a primary content provider and then using these metrics to select the resolved content provider) may be extended to an n-phase resolution mechanism. However, the ability to customize a SmartLink based on the needs of the client, the server, and the content providers is what enables customization and supports high availability as lacking in the traditional static-link approach.

Figure 5:
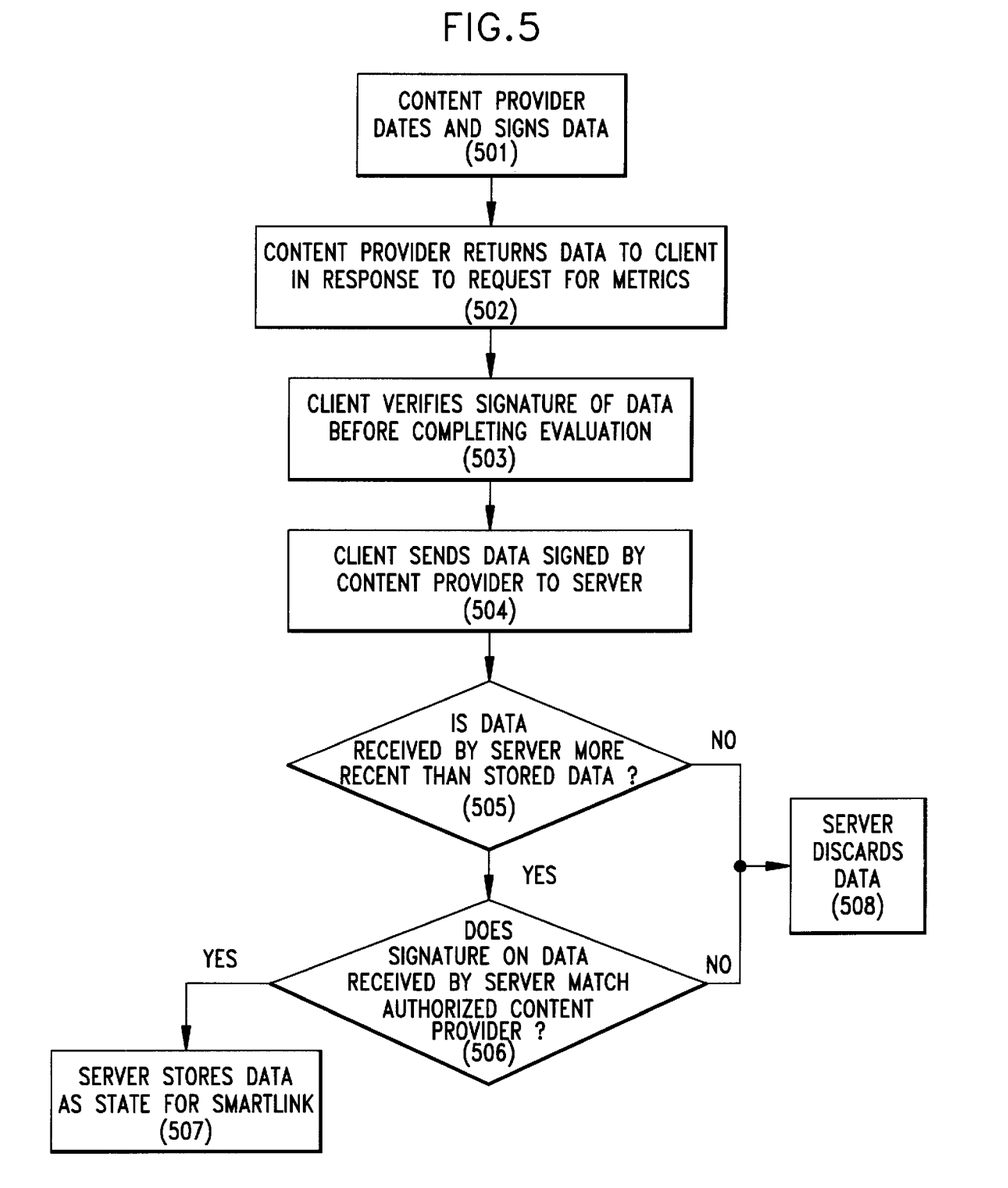
FIG. 5 shows the embodiment of a secure write-back mechanism enabling the storage of metrics at a server machine for future use by a SmartLink.

FIG. 5 depicts an example of the process for a secure write-back mechanism 107 involving the client and the server. One skilled in the art will appreciate that a separate data storage site could be used in lieu of the server in this protocol. Note that use of secure write-back, although recommended, is optional: this process may be replaced with an unsecure write-back mechanism. All security mechanisms described in this document use standard security techniques. In particular, techniques for digital signatures, encryption, authentication, and building certificates may be found in C. Kaufman et al., "Network Security: Private Communication in a Public World", Prentice-Hall, Inc, Englewood Cliffs, N.J., 1995; and in B. Schneier, "Applied Cryptography Second Edition: Protocols, Algorithms, and Source Code in C.", John Wiley & Sons, Inc., N.Y. 1996. The resolved content provider 111 signs and time stamps 501 all data before the data is transferred 502 to the client machine 101 using the content delivery mechanism 112. The signature verification module 212 of the SmartLink CC script 104 verifies the signature and freshness of the data before writing the parameters received from the content provider to its metric data 233 and updating its operational data time stamp 231. The signature is verified 503 based on the signature information stored in the content provider certificate 222. The signature information from the metrics is stored as the operational data content provider signature 234. After authentication of the metrics, the signed data is sent 504 by the SmartLink CC 101 to the server machine 115. The server machine determines if the data is more recent than current data stored 505 and if so validates authority of the content provider to provide metrics 506. If these conditions hold the metrics are stored 507 in the image 116 for use by future invocations 401 of the SmartLink CC and is provided to a client machine 101 as the SmartLink CC is downloaded 403. If the tests for newness and validity fail, the data is discarded 508.

Figure 7:
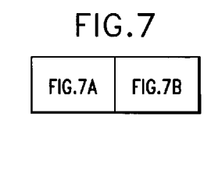
FIG. 7 shows the process of a content provider or node which is available to serve as a content provider.
Figure 7A:
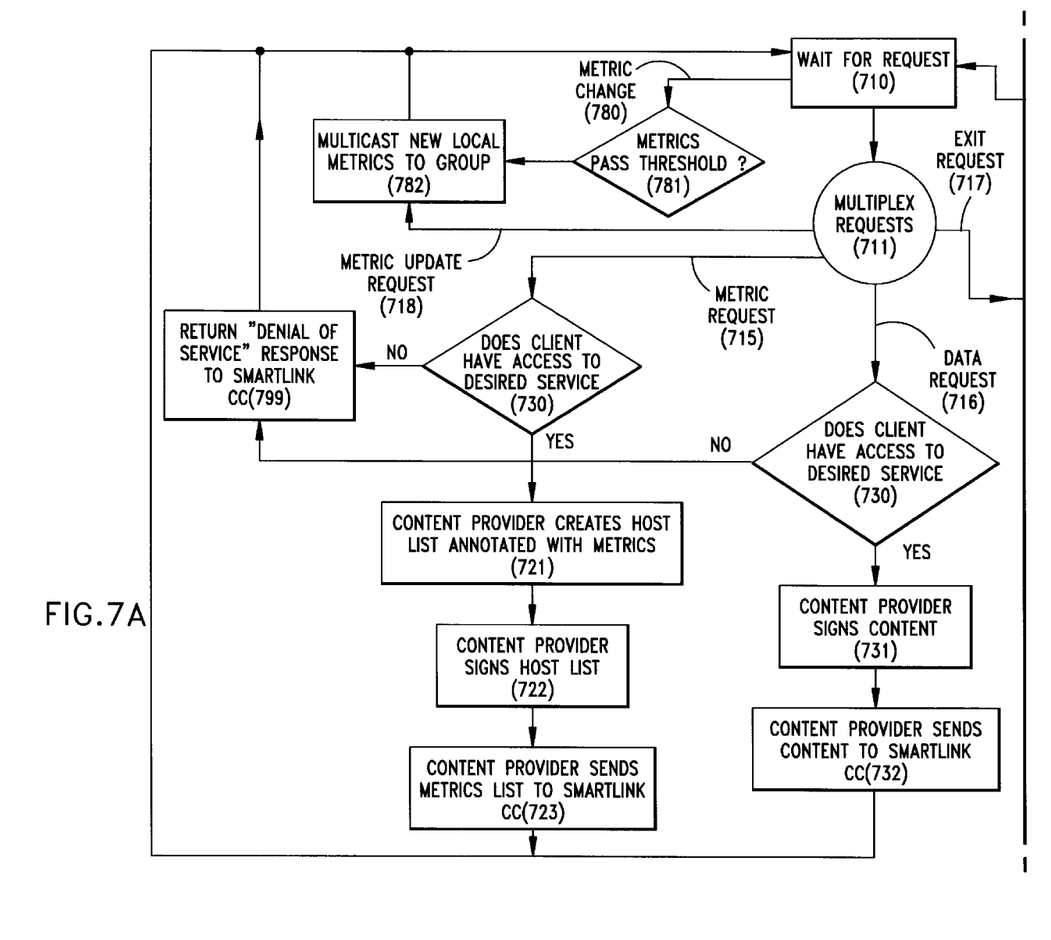
Figure 7B:
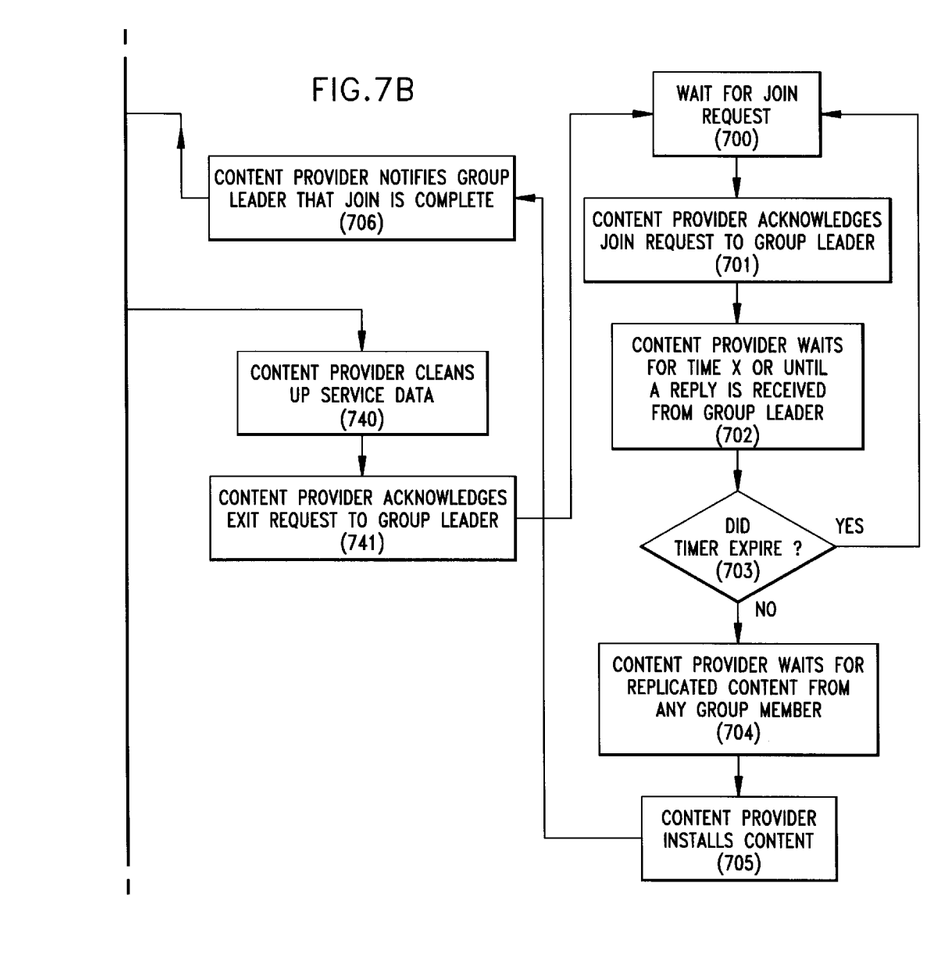

FIGS. 6 and 7 illustrate examples of protocols that comprise the functions of the SmartLink Provider component (PC) 250.

A content provider group 108 consists of a set of nodes acting as content providers 110. The content providers in the group are differentiated by a set of metrics appropriate to the client requirements and environment. FIG. 6 illustrates the process of the group leader 118 in a content provider group 108.

The group leader 118 maintains a group of nodes where each node contains the service content and maintains metric information that differentiates the content providers 110 comprising the content provider group 108. The content providers share metric information between themselves. The SmartLink CC uses these metrics (which it obtains from the PC—FIG. 7) to select between content providers in the group. This selection is done using the metric evaluation module 211 of the SmartLink Script 104 which may determine the most suitable content provider group and the most suitable content provider in the group. The metric types are chosen by the SmartLink creator 117 and reflect the influence of the metrics on function and service level as believed by the creator.

An example of a metric set is:
1. Node load: time average load index
2. Node memory: time average memory usage
3. Physical Node memory: fixed physical node memory
4. Liveness: is the node up or down
5. Reliability: mean time to failure of a (provider/node)
6. Software license availability
7. Cumulative performance metrics
8. Cost of accessing node
9. Geographic proximity of server node to client node
10. Security restrictions for accessing services Since a content provider 110 may support multiple SmartLinks Client-Side Components (CC) 103, multiple metrics sets may have to be maintained. Metrics may be updated between group members periodically or aperiodically. In the periodic update mode, each content provider 110 multicasts its metrics to all group members. In the case of periodic updates a group leader controls the periodicity of the updates. In the case of aperiodic updates individual members of the group may propagate their updates when a metric or group of metrics cross a specified threshold on that node. The site leader specifies the thresholds. The membership of a content provider group can change dynamically over time.

By supporting dynamic membership for content provider groups, SmartLinks may be made highly available. Without this SmartLinks may be made highly available. Without this capability, existing systems must foresee all load changes and add explicit static links to all nodes supporting a service. For each load change, for example if a very popular piece of software is being distributed by the content provider, new nodes must be added explicitly in the form of static links. When the load decreases, the links must be explicitly removed. With dynamic membership for content providers, a SmartLink may choose from the most suitable member of a content provider group whose size is automatically tailored to be optimal for the current execution environment.

Membership changes are explicitly controlled by metric changes in the system. We view node death as a change in the liveness metric of that node. Node death is determined by monitoring the update messages (in the case of periodic updates) or by a circular ping protocol in the case of aperiodic updates.

Membership changes are preferably initiated (the necessary protocols are run and controlled by the group leader) by an elected group leader. Leader election can be done by standard protocols as presented in the book Distributed Systems edited by Sape Mullender, ed., . Distributed Systems . . . , ACM Press, New York, 1989. The only change over normal leader election protocols is that these changes are propagated over the Internet. These protocols are intended to run over the Internet. The point of the protocols is to provide some guarantee that the "best available site" is contacted by the client side of the protocol. Note that a person skilled in the art will realize that the functionality of the group leader may be distributed between the members of the group rather than coordinated at one distinguished node.

As shown in FIG. 6, the process of the group leader 118 is defined as a repetitive process. Note that the group leader may also be acting as a content provider, following the process in FIG. 7 concurrently. If a periodic metric update is being used and the current metrics are determined 602 to be old, the group leader requests 603 updated metrics from group members. The group members will process this request as a metric update request 718.

Referring again to FIG. 6, the group leader continually examines 601 the metrics for machines in the group. If the group members are overloaded 610, the group leader multicasts 611 a "join" request to all available nodes. The group leader then waits 612 for all requests within a specified time quantum. If no replies are received 613, the group leader returns to its wait loop 601. Otherwise, the leader chooses 614 the best new group member based on its load and requests 614 this site to join its group. To enable participation of the the new node, the group leader requests 615 a group member to transfer its data to the new node. Upon notification 616 that the new node is ready to join the group, the group leader notifies 617 the rest of the group that the new member has joined and provides the new node's metrics. If the group leader examines 601 its metrics for machines in the group and the group members are underloaded 620, the group leader selects 621 a node to remove from the group based on current metrics. Once selected, the node to be removed from the group is notified 622 as well as the remainder of the group 623.

FIG. 7 also illustrates an example of the process by which nodes may be available for membership in the content provider group 108. The number of nodes which are active content providers 110 is dependent on the load of the content providers. As depicted, each of these nodes initially is in a state waiting 700 for a "join" request from an authorized group leader 118. When waiting for a join request, the node may perform other operations including serving as a content provider for other services.

Upon receipt of a request, the node notifies 701 the group leader that it is willing to join the group and then waits 702 for a reply. If a reply is not received by the expiration 703 of a timer, the node returns to its waiting state 700. Otherwise the node waits to receive the packaged content from a member of the content provider group 110. Upon reception 704 of the packaged content the data is installed 705 and the node, now a content provider, notifies 706 the group leader that it is initialized and acts as a SmartLink Provider Component (PC) 250 by waiting 710 for server requests from a SmartLink Client-Side component (CC) 103.

Each content provider waits for one of four different requests: a metric request 715, a data request 716, an exit request 717, or a metric update request 718. While it waits, if an aperiodic metric update protocol is in use, the content provider will examine 780 its local metrics 114 it to determine if an update is necessary. The metric update will also be performed upon receipt of a metric update request 718. If the metrics are perturbed significantly 781 or a metric update request is received, the content provider multicasts 782 its new metrics to the members of its group.

Upon reception of a request a content provider 110 chooses 711 an action to perform based on the nature of the request. Upon receipt of a metric request 715, a PC 250 first checks 720 if the requesting CC 103 is authorized for the request. If access is not permitted 799 a "denial of service" response is returned to the PC. If access is permitted the PC creates 721 an annotated host list as determined by parameters included by the CC 103 in the request 715. These parameters identify the client, define its characteristics, and indicate the metrics relevant to its desired service and service level. The list is signed 722 by the SS 250 to ensure its authenticity and integrity and then returned 723 to the client. The transport mechanism used to accomplished this message transfer can be either HTTP or RPC.

Upon receipt of a data request 716, a PC 250 first checks 730 if the requesting CC 103 is authorized to receive the data. If access is not permitted 799 a "denial of service" response is returned to the PC. If access is permitted the PC signs 731 the content to be delivered to ensure its authenticity and integrity and then returns 732 the data to the client. An exit request 717 will be generated by the group leader 118 when the load on the content providers is too low. (See FIG. 6 for a description of this process). Upon receipt of a exit request 717 from the group leader, the content provider cleans up the data for the service 740. Cleaning up the data may involve either moving the data to cheaper storage such as magnetic tape or eliminating the data completely. The content provider then acknowledges 741 the exit request to the group leader and begins waiting 700 for a join request.

Now that the invention has been described by way of the preferred embodiment, with alternatives, various modifications and improvements will occur to those of skill in the art. Thus, it should be understood that the preferred embodiment has been provided as an example and not as a limitation. The scope of the invention is defined by the appended claims.

We claim:

1. A computerized method for naming resources in a distributed computing environment wherein the resource is represented by a combination of code and data which is evaluated at a client, the method comprising the steps of:

issuing a resource request from the client to a server;

delivering from the server to the client a reference to the resource, wherein the reference includes the code and the data; and evaluating and resolving the code and the data at the client to obtain a resource name.

2. The method of claim 1, wherein the evaluating step further comprises the step of querying the distributed environment for environmental parameters, wherein the distributed environment includes at least one of the client, a network, a creator, the server, and a content provider.

3. The method of claim 2, wherein the querying step is performed in a number of phases as a function of the conditions defined in the code and data, wherein each phase comprises the step of evaluating the code and data; and querying the distributed environment to obtain additional environmental parameters for a subsequent phase.

4. The method of claim 1, comprising the steps of:

the server communicating customization parameters to a creator;

the creator assembling the code and the data including initial environmental parameters; and the creator delivering the code and data to the server.

5. The method of claim 4 wherein the steps of communicating customization parameters, assembling the code and data, and delivering the code and data to the server are performed in response to each resource request.

6. The method of claim 4 wherein the server is also the creator.

7. The method of claim 1 wherein the evaluating step further comprises the steps of:

the client sending intermediate results to the server; and the server storing the intermediate results for delivery in response to a subsequent resource request.

8. The method of claim 2 wherein the querying step further comprises the steps of:

each content provider sending a set of distributed environmental parameters to other content providers in a content provider group, wherein the update is either aperiodic or periodic as coordinated by a group leader; and nodes within the distributed computing environment dynamically joining and leaving a group of content providers as directed by the group leader, wherein nodes joining the group are sent content and distributed environmental parameters for the group of content providers by at least one group member; and wherein nodes leaving the group notify the content providers in the group of their departure, either directly or by notifying the group leader.

9. A resource naming mechanism for a distributed computing environment wherein a resource is represented by a combination of code and data which is evaluated at a client, comprising:

means for issuing a resource request from the client to a server;

means for delivering from the server to the client a reference to the resource, wherein the reference includes the code and the data; and means for evaluating and resolving the code and the data at the client to obtain a resource name.

10. The resource naming mechanism of claim 9, wherein the means for evaluating further comprises:

means for querying the distributed environment for environmental parameters, wherein the distributed environment includes at least one of the client, a network, a creator, the server, and a content provider.

11. The resource naming mechanism of claim 10, wherein the means for querying is performed in a number of phases as a function of the conditions defined in the code and data, wherein each phase comprises:

means for evaluating the code and data; and means for querying the distributed environment to obtain additional environmental parameters for a subsequent phase.

12. The resource naming mechanism of claim 9, comprising:

server means for communicating customization parameters to a creator;

creator means for assembling the code and the data including initial environmental parameters; and creator means for delivering the code and data to the server.

13. The resource naming mechanism of claim 12 wherein the server means for communicating customization parameters, creator means for assembling the code and data, and creator means for delivering the code and data to the server are coupled to and in response to each resource request.

14. The resource naming mechanism of claim 12 wherein the server is also the creator.

15. The resource naming mechanism of claim 9 wherein the evaluating step further comprises the steps of:

the client sending intermediate results to the server; and the server storing the intermediate results for delivery in response to a subsequent resource request.

16. The resource naming mechanism of claim 10 wherein the querying step further comprises the steps of:

each content provider sending a set of distributed environmental parameters to other content providers in a content provider group, wherein the update is either aperiodic or periodic as coordinated by a group leader; and nodes within the distributed computing environment dynamically joining and leaving a group of content providers as directed by the group leader, wherein nodes joining the group are sent content and distributed environmental parameters for the group of content providers by at least one group member; and wherein nodes leaving the group notify the content providers in the group of their departure, either directly or by notifying the group leader.

* * * * *